United States Patent
Tomita

(10) Patent No.: US 6,895,469 B2
(45) Date of Patent: May 17, 2005

(54) DISK ARRAY APPARATUS AND PARITY PROCESSING METHOD THEREIN

(75) Inventor: Haruo Tomita, Iruma (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 329 days.

(21) Appl. No.: 10/231,247

(22) Filed: Aug. 30, 2002

(65) Prior Publication Data

US 2003/0105922 A1 Jun. 5, 2003

(30) Foreign Application Priority Data

Nov. 30, 2001 (JP) ........................................ 2001-367849

(51) Int. Cl.$^7$ ............................................. G06F 12/00
(52) U.S. Cl. ..................... 711/114; 711/157; 711/206; 711/207
(58) Field of Search ................................ 711/206, 207, 711/157, 114

(56) References Cited

U.S. PATENT DOCUMENTS 5,303,244 A * 4/1994 Watson ........................... 714/5

6,219,752 B1     4/2001   Sekido
6,233,648 B1     5/2001   Tomita
6,571,351 B1 * 5/2003   Mitaru et al. .................. 714/6
2002/0188655 A1 * 12/2002 Brown et al. ............... 709/201

FOREIGN PATENT DOCUMENTS

| JP | 5-88988 | 4/1993 |
|---|---|---|
| JP | 2000/010738 | 1/2000 |
| JP | 2000-47832 | 2/2000 |
| JP | 2001-100939 | 4/2001 |

OTHER PUBLICATIONS

U.S. Appl. No. 10/231,027, filed Aug. 30, 2002, to Tomita.
U.S. Appl. No. 10/231,157, filed Aug. 30, 2002, to Tomita.
U.S. Appl. No. 10/231,349, filed Aug. 30, 2002, to Tomita.

* cited by examiner

Primary Examiner—Jack A. Lane
(74) Attorney, Agent, or Firm—Finnegan, Henderson, Farabow, Garrett & Dunner, L.L.P.

(57) ABSTRACT

A controller uses an address translation table to search for a logical address of a valid logical block used by a host computer. The controller then loads from a disk array only a physical stripe containing a physical block with a physical address corresponding to the valid logical address. The controller performs parity processing for only the loaded physical stripe.

8 Claims, 5 Drawing Sheets

7 ADDRESS TRANSLATION TABLE

| LA# | ST# | BLK# | TS# |
|---|---|---|---|
| L0 | 100 | 3 | 99 |
| L1 | 1000 | 4 | 999 |
| L2 | 1 | 5 | 21 |
| ⋮ | ⋮ | ⋮ | ⋮ |
| Li | NULL | NULL | NULL |
| ⋮ | ⋮ | ⋮ | ⋮ |

8 STRIPE TABLE

| ST# | F |
|---|---|
| 0 | F1 (PROCESSED AND SUCCESS) |
| 1 | F2 (PROCESSED AND FAILURE) |
| ⋮ | ⋮ |
| 100 | F0 (UNPROCESSED) |
| ⋮ | ⋮ |

DISK ARRAY APPARATUS AND PARITY PROCESSING METHOD THEREIN

CROSS-REFERENCE TO RELATED APPLICATIONS

This application is based upon and claims the benefit of priority from the prior Japanese Patent Application No. 2001-367849, filed Nov. 30, 2001, the entire contents of which are incorporated herein by reference.

BACKGROUND OF THE INVENTION

1. Field of the Invention

The present invention relates to a disk array apparatus having a disk array constituted by a plurality of disk drives, and a parity processing method in the disk array apparatus.

2. Description of the Related Art

Conventionally, various types of disk array apparatuses each having a disk array represented by RAID (Redundant Array of Inexpensive Disks, Redundant Array of Independent Disks) which is constituted by a plurality of disk drives have been developed. The disk array is generally accessed for each physical stripe. U.S. Pat. No. 6,219,752 or U.S. Pat. No. 6,233,648 discloses a high-speed write method for a disk array apparatus. In this write method, when receiving an update (write) request from a host computer, contents in the storage area of old data to be updated normally are not rewritten, and the updated data is stored in a buffer first. When updated data with a predetermined quantity are stored in the buffer, these updated data are written in empty areas other than the area of the old data on the plurality of disk drives in bulk. Such a write method is called as a delay write method.

To prepare for a case wherein a failure (fault) occurs in one of the plurality of disk drives that constitute the disk array, the disk array apparatus generally employs a redundant configuration which is known as, e.g., RAID. That is, when any disk drive fails in the disk array apparatus, a preliminary disk drive is used instead of the faulty disk drive to reconstitute the disk array.

In this manner, the disk array apparatus can cope with a failure in a single disk drive. On the other hand, it is important to detect a disk drive abnormality before the disk drive fails. To detect a disk drive abnormality early, the conventional disk array apparatus using the above-mentioned delay write method performs parity processing with the following procedures.

That is, all physical stripes on the disk array are loaded one by one. Parity data are generated from data of logical blocks contained in the physical stripes. Each generated parity data is compared with parity data which has been stored, in advance, in a corresponding physical stripe to check the consistency between them. Alternatively, the generated parity data are written in a predetermined disk drive.

In this manner, the conventional parity processing must load all the physical stripes on the disk array. This requires a very long period of time to process all the physical stripes. The processing time depends on the data capacity of the disk array and prolongs with an increase in capacity.

BRIEF SUMMARY OF THE INVENTION

It is an object of the present invention to provide a disk array apparatus which can shorten a time required for parity processing for detecting a disk drive abnormality, and a parity processing method in the disk array apparatus.

According to a first aspect of the present invention, there is provided a disk array apparatus having a disk array with a redundant configuration which is constituted by a plurality of disk drives and detected by a host computer as one logical disk drive, comprising an address translation table in which address translation information used for translating a logical address of a valid logical block used by the host computer into a physical address on the disk array in which the valid logical block is stored is set, search means for searching the address translation table for a valid logical address, loading means for loading from the disk array, on the basis of the valid logical address searched by the search means, only a physical stripe containing a physical block with a physical address corresponding to the valid logical address, and parity processing means for performing a predetermined parity process for the physical stripe loaded by the loading means.

According to a second aspect of the present invention, there is provided a disk array apparatus having a disk array with a redundant configuration which is constituted by a plurality of disk drives and detected by a host computer as one logical disk drive, comprising an address translation table in which address translation information used for translating a logical address of a valid logical block used by the host computer into a physical address on the disk array in which the valid logical block is stored is set, search means for searching the address translation table for a valid logical address, table generation means for generating a stripe table in which information representing a physical stripe containing a physical block with a physical address corresponding to the valid logical address searched by the search means is set, loading means for acquiring the information of the physical stripe containing the physical block with the physical address corresponding to the valid logical address from the stripe table generated by the table generation means, and loading the physical stripe from the disk array on the basis of the acquired information, and parity processing means for performing a predetermined parity process for the physical stripe loaded by the loading means.

According to a third aspect of the present invention, there is provided a disk array apparatus which has a disk array with a redundant configuration constituted by a plurality of disk drives, divides data, that is requested by a host computer to be written, into blocks to store the blocks in a buffer, and when data of a predetermined number of blocks are stored in the buffer, writes data of one stripe, which contains the data of a predetermined number of blocks and parity data for that data, in physically contiguous areas of empty areas of the disk array, comprising an address translation table in which address translation information used for translating a logical address of a valid logical block used by the host computer into a physical address on the disk array in which the valid logical block is stored is set, search means for searching the address translation table for a valid logical address, loading means for loading from the disk array, on the basis of the valid logical address searched by the search means, only a physical stripe containing a physical block with a physical address corresponding to the valid logical address, and parity processing means for performing a predetermined parity process for the physical stripe loaded by the loading means.

According to fourth aspect of the present invention, there is provided a parity processing method in a disk array apparatus having a disk array with a redundant configuration which is constituted by a plurality of disk drives and detected by a host computer as one logical disk drive, comprising searching for a valid logical address an address translation table in which address translation information used for translating a logical address of a valid logical block used by the host computer into a physical address on the disk array in which the valid logical block is stored is set, loading from the disk array, on the basis of the searched valid logical address, only a physical stripe containing a physical block with a physical address corresponding to the valid logical address, and performing a predetermined parity process for the loaded physical stripe.

According to fifth aspect of the present invention, there is provided a parity processing method in a disk array apparatus having a disk array with a redundant configuration which is constituted by a plurality of disk drives and detected by a host computer as one logical disk drive, comprising searching for a valid logical address an address translation table in which address translation information used for translating a logical address of a valid logical block used by the host computer into a physical address on the disk array in which the valid logical block is stored is set, generating a stripe table in which information representing a physical stripe containing a physical block with a physical address corresponding to the searched valid logical address is set, acquiring the information of the physical stripe containing the physical block with the physical address corresponding to the valid logical address from the stripe table, and loading the physical stripe from the disk array on the basis of the acquired information, and performing a predetermined parity process for the loaded physical stripe.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the accompanying drawing.

Figure 1:
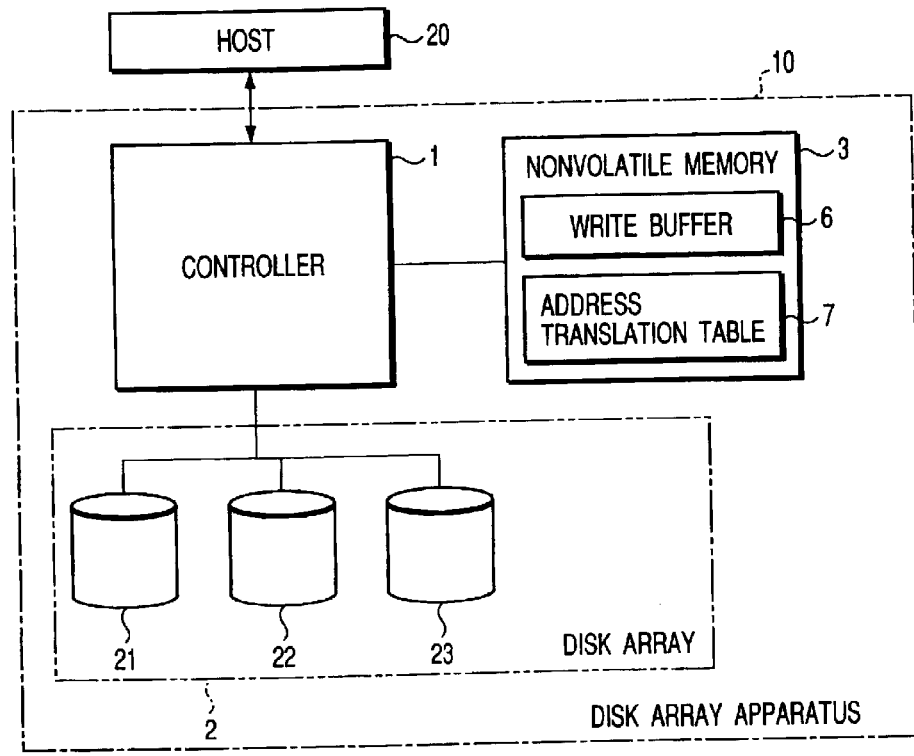
FIG. 1 is a block diagram showing the arrangement of a computer system with a disk array apparatus according to an embodiment of the present invention.

FIG. 1 is a block diagram showing the arrangement of a computer system having a disk array apparatus according to an embodiment of the present invention.

As shown in FIG. 1, a disk array apparatus 10 is comprised of a controller 1, a disk array 2 connected to the controller 1, and a nonvolatile memory 3 connected to the controller 1.

The disk array 2 is constituted by a plurality of disk drives, e.g., three disk drives 21, 22, and 23. The disk array 2 employs a redundant configuration such that, if one of the disk drives 21 to 23 fails, data in the faulty disk drive can be restored (reconstructed). In this case, for the sake of descriptive convenience, it is assumed that the disk array 2 employs the redundant configuration of RAID4. In addition, specific one of the disk drives 21 to 23, e.g., the disk drive 23 is assigned as a parity disk drive which stores parity data.

The controller 1 is a disk array controller for controlling the disk array 2 and connected to a host computer (to be referred to as a host hereinafter) 20. The host 20 detects the disk array 2 as one logical disk drive. As an interface between the host 20 and controller 1, for example, SCSI (Small Computer System Interface), PCI bus (Peripheral Component Interconnect Bus), or the like can be applied.

In this embodiment, the arrangement shown in FIG. 1 will be mainly described. However, those skilled in the art recognize, without a detailed description thereof, that the present invention can be practiced even when any other computer system derived from the arrangement shown in FIG. 1 is to be used. For example, the disk array implementation method described in Jpn. Pat. Appln. KOKAI Publication No. 2000-10738, p25, right column, paragraphs 0042 to 0045 can be applied to implement the controller 1. The disk array implementation method described in this reference is as follows.

1a) A disk array controller is implemented as the part of a host computer. For example, the disk array controller is implemented on the main board of the host computer.

1b) A disk array controller is implemented by adding it to the expansion slot of a computer. For example, the disk array controller is implemented on a PCI card connected to a PCI slot.

1c) A disk array controller is implemented outside a host computer. This method corresponds to a method of implementing the controller 1 shown in FIG. 1, which is applied in this embodiment.

1d) A disk array controller is implemented by software on a host computer.

Before the arrangement in FIG. 1 is described in detail, terms used in the description of this embodiment will be explained.

2a) Logical Block

A logical block is a data block when viewed from the host 20. More specifically, the logical block is a data block on a logical disk area in the disk array 2.

2b) Physical Block

A physical block is a physical block on the disk array 2. More specifically, the physical block is a data block on a physical disk area in the disk array 2, which has a predetermined, constant size.

2c) Logical Address

A logical address is a data address on the disk array 2 when viewed from the host 20. In this case, the logical address is used as a logical block address which represents the position of a data block on a logical disk area in the disk array 2, i.e., the position of a logical block.

2d) Physical Address

A physical address is used to represent the physical position of data (data block) on the disk array 2. The physical address is a physical block address which represents the physical position of a data block on the disk array 2, i.e., the position of a physical block. The physical address has a physical stripe number and physical block number to be described later.

2e) Logical Address Tag

A logical address tag includes a time stamp and a logical address corresponding to each logical block.

2f) Parity Block

A parity block is a data block comprised of redundant data corresponding to a plurality of logical blocks.

2g) Logical Address Tag Block

A logical address tag block is a data block comprised of a logical address tag.

2h) Logical Block Number

A logical block number is a data block number of a data block on the disk array 2 when viewed from the host 20.

2i) Physical Block Number

A physical block number is a number which represents a relative position of a data block in a physical stripe on the disk array 2. The physical block number is a number unique to each disk drive constituting the disk array 2.

Referring to FIG. 1, the controller 1 controls the disk array 2 in accordance with a control program stored in a storage means such as a ROM (not shown) in advance. The controller 1 also manages a write buffer 6 and address translation table 7 in accordance with the control program. The write buffer 6 and address translation table 7 are allocated in the rewritable nonvolatile memory 3.

Each of the disk drives 21 to 23 that constitute the disk array 2 writes data in a K (K is an integer larger than 0) multiple of a predetermined block size. At this time, the respective K blocks physically identical in position on the disk drives 21 to 23 are written at the same timings as the respective stripe segments which make up one physical stripe. Obviously, in the disk array 2 constituted by the three disk drives 21 to 23, one stripe is made up of three stripe segments. If the disk array 2 has N+1 disk drives (N is an integer larger than 1, and N=2 in the example shown in FIG. 1), and one stripe segment has K blocks, one stripe is made up of (N+1)×K data blocks.

More specifically, one stripe is made up of N×K−1 logical blocks, one logical address tag block, and K parity blocks. Assuming that N=2 and K=3, one stripe is made up of five logical blocks, one logical address tag, and three parity blocks (see FIG. 2).

The controller 1 employs a high-speed write method similar to that described in the Description of the Related Art. That is, when receiving an update (write) request from the host 20, the controller 1 does not rewrite contents in old data areas in the disk array 2 and writes updated data in the empty areas of the write buffer 6, with the updated data being divided into blocks. The write buffer 6 has a storage capacity of one stripe−one stripe segment, i.e., a storage capacity of N×K data blocks.

When data blocks of a predetermined quantity T are stored in the write buffer 6, the controller 1 generates a logical address tab block comprised of a logical address tag and time stamp and stores the generated block in the write buffer 6. The predetermined quantity T equals one stripe−(one stripe segment+one data block). Assuming that N=2 and K=3, T=9−(3+1)=5 (see FIG. 2). At the time when five data blocks are stored in the write buffer 6, a logical address tag block is generated and then added to the write buffer 6.

Subsequently, the controller 1 generates parity data (K parity blocks) of one stripe segment from "data of one stripe−one stripe segment (N×K data blocks)" on the write buffer 6, which data contain the logical address tag. The controller 1 writes in the disk array 2 data of one stripe that is made up of "data of one stripe−one stripe segment" and the parity data of one stripe segment in bulk. The data of one stripe is written in physically contiguous areas in empty areas on the N+1 disk drives (in the example shown in FIG. 1, three disk drives 21 to 23) that constitute the disk array 2. The contiguous areas are areas other than the areas storing data to be updated.

Figure 2:
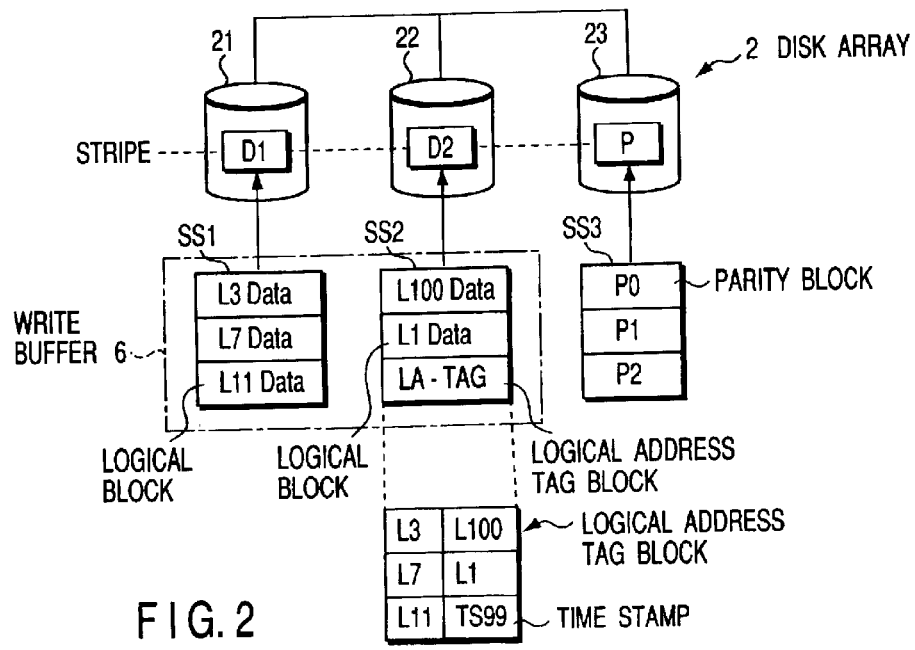
FIG. 2 is a view showing an example of data of one stripe and a state in which the data of one stripe is written in disk drives in a disk array.

FIG. 2 shows an example (K=3) of data of one stripe prepared by the controller 1 and a state in which the data of one stripe is written in the disk drives 21 to 23 in the disk array 2. In the example shown in FIG. 2, three stripe segments SS1, SS2, and SS3 are respectively written in the empty areas of the disk drives 21 to 23 as data D1, D2, and P that make up one stripe.

The stripe segment SS1 is made up of logical blocks (L3Data, L7Data, and L11Data) having logical addresses L3, L7, and L11. The stripe segment SS2 is made up of a logical address tag block (LA-TAG) and logical blocks (L100Data, L1Data) having logical addresses L100 and L1. The stripe segment SS3 is made up of parity blocks P0, P1, and P2.

The parity block P0 is a parity block corresponding to the logical blocks with the logical addresses L3 and L100. The parity block P1 is a parity block corresponding to the logical blocks with the logical addresses L7 and L1. The parity block P2 is a parity block corresponding to the logical block with the logical address L11 and the logical address tag block (LA-TAG). In this case, the parity block P0 is generated by exclusive OR (XOR) of the logical blocks with the logical addresses L3 and L100. The parity block P1 is generated by exclusive OR of the logical blocks with the logical addresses L7 and L1. The parity block P2 is generated by exclusive OR of the logical block with the logical address L11 and the logical address tag block (LA-TAG).

The address translation table 7 is a translation map used for translating a logical address (logical block address) into a physical address (physical block address). In this case, the address translation table 7 is used for translating a data address on the disk array 2 when viewed from the host 20, i.e., a logical address into an address representing a physical data position in the disk array 2, i.e., a physical address.

Figures 3, 4, 5:
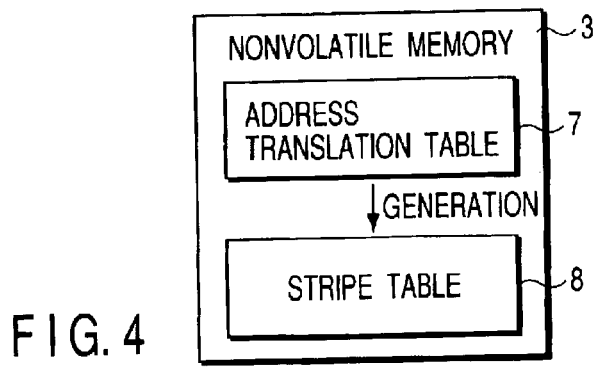
FIG. 3 is a table showing a data structure of an address translation table.
FIG. 4 is a view for explaining a stripe table generation method.
FIG. 5 is a table showing a data structure of the stripe table.

FIG. 3 shows the data structure of the address translation table 7. In the example shown in FIG. 3, each entry in the address translation table 7 corresponds to a unique logical address. In this case, in consideration of an efficiency when the address translation table 7 is looked up, the ith entry of the address translation table 7 corresponds to the logical address i. The number of entries of the address translation table 7 coincides with the number of all logical addresses that are viewed from the host 20.

Information (address translation information) in each entry of the address translation table 7 contains a logical address (logical block address) LA#, physical stripe number ST#, physical block number BLK#, and time stamp TS#. The physical stripe number ST# represents a physical stripe containing a physical block on the disk array 2, to which a logical block represented by a corresponding logical address (logical block address) LA# is allocated. The physical block number BLK# represents a relative position of the physical block contained in the physical stripe represented by the physical stripe number ST#. The time stamp TS# is information for managing the time order in which a data block with a corresponding logical address LA# is written in the disk array 2. Note that, in a case wherein the ith entry of the address translation table 7 corresponds to the logical address i as in this embodiment, the ith entry can be looked up from the corresponding logical address i. Hence, the item of the logical address is not necessary prepared in the entry.

In the initial state of the address translation table 7, valid data is set in only the item of the logical address in each entry. At this time, "NULL"s are set in other items in each entry of the address translation table 7. A logical address corresponding to the entry of the address translation table 7 in which "NULL"s are set represents a logical address of an invalid logical block which is not used by the host 20. In the example shown in FIG. 3, the logical address Li is a logical address of an invalid logical block. In contrast, a logical address corresponding to the entry of the address translation table 7 in which data other than "NULL"s are set represents a logical address of a valid logical block used by the host 20. In the example shown in FIG. 3, the logical addresses L0, L1, and L2 are the addresses of valid logical blocks.

In the following description, for the sake of descriptive convenience, the expressions of an "invalid logical address" and a "valid logical address", or "a logical address is valid" and "a logical address is invalid" may be used.

Upon writing data of one stripe in the empty areas of the disk drives 21 to 23, the controller 1 sets in the address translation table 7 the relationship between a physical address and the logical address of a logical block for each logical block in that stripe. More specifically, a physical block number and a physical stripe number in an entry in the address translation table 7 which correspond to the logical address of each logical block in that stripe are respectively updated to a number representing a physical block position in the physical stripe in which the corresponding logical block is actually written, and a number representing this physical stripe.

In this embodiment, at the time when parity consistency check (parity check) process or parity generation process to be described later starts, a stripe table 8 is generated on the nonvolatile memory 3 on the basis of the address translation table 7, as shown in FIG. 4. The stripe table 8 is used for managing the physical stripe containing the logical blocks with valid logical addresses used by the host 20.

As shown in FIG. 5, information in each entry of the stripe table 8 contains a flag F and the physical stripe number ST# of a physical stripe containing the logical blocks with valid logical addresses. The flag F comprises three flags F0, F1, and F2. The flag F0 represents that no parity consistency check process or parity generation process is executed to the physical stripe of a corresponding physical stripe number, i.e., that the physical stripe is unprocessed. The flag F1 represents that parity consistency check or parity generation has been performed for a physical stripe having a corresponding physical stripe number, and the parity consistency check or parity generation is successful. The flag F2 represents that parity consistency check or parity generation has been processed to a physical stripe having a corresponding physical stripe number, and the parity consistency check or parity generation has failed.

The example shown in FIG. 5 represents that the physical stripes of the physical stripe numbers ST# of 0 and 1 (the physical stripes 0 and 1) have undergone parity consistency check process or parity generation process, and the physical stripe 0 is successful in that process and the physical stripe 1 fails. The physical stripe of the physical stripe number 100 (the physical stripe 100) undergoes no parity consistency check or parity generation.

Parity processes, parity consistency check process and parity generation process for the disk array apparatus 10 in this embodiment will be separately described next.

[Parity Consistency Check Process]

Figure 6:
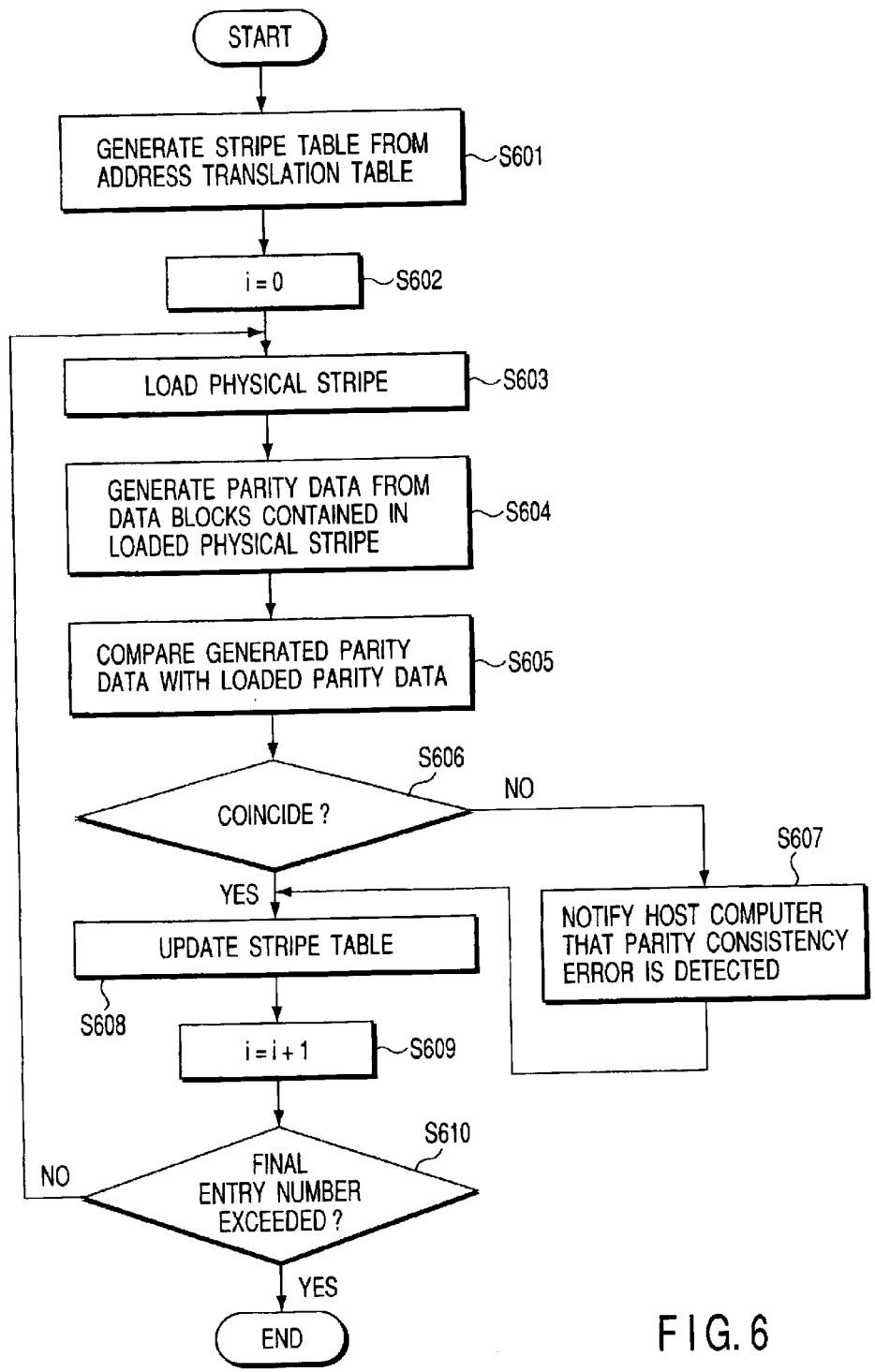
FIG. 6 is a flow chart showing parity consistency check process of the disk array apparatus.

FIG. 6 is a flow chart showing parity consistency check processing of the disk array apparatus 10. This parity consistency check processing may be executed in response to a request from the host 20, or may be periodically executed by the patrol function of the disk array apparatus 10.

First, the controller 1 looks up each entry of the address translation table 7 to search for a physical stripe number corresponding to a valid logical address. The controller 1 then generates on the nonvolatile memory 3 the stripe table 8 having only the pieces of physical stripe information (in this case, physical stripe numbers) corresponding to the searched valid logical addresses (step S601).

The physical stripe number corresponding to the valid logical address is searched for by, e.g., while incrementing a logical address (or incrementing an entry number which represents an entry in the address translation table 7), looking up an entry corresponding to the logical address (entry number) in the address translation table 7 and checking whether data other than "NULL" is set in each item in that entry.

Note that a flag representing valid/invalid logical address may be set in each entry in the address translation table 7 and looked up to determine whether a corresponding logical address is valid. The controller 1 adds an entry to the stripe table 8 on the nonvolatile memory 3, and sets in the added entry the physical stripe number corresponding to the valid logical address which is set in an entry in the address translation table 7. However, when an entry in which the same physical stripe number corresponding to the valid logical address has been already set is present on the stripe table 8, neither entry addition nor physical stripe number setting with respect to the added entry is done. That is, when not only one valid logical block is present on one physical stripe, but also a plurality of valid logical blocks are present thereon, the controller 1 controls such that only one entry in which the physical stripe number of that physical stripe is set is present in the stripe table 8.

In this manner, the stripe table 8 is generated in which the physical stripe numbers of the physical stripes corresponding to the logical addresses of all the valid logical blocks that are used by the host 20 are set.

After the stripe table 8 is generated, the controller 1 sets the initial value 0 in the entry number i representing the entry in the stripe table 8 (step S602).

Subsequently, the controller 1 acquires a physical stripe number set in the entry of the entry number i in the stripe table 8, and loads the physical stripe having this physical stripe number from the disk array 2 (step S603).

The controller 1 generates parity data from the data blocks of the loaded physical stripe (step S604). Referring to the example shown in FIG. 2, parity data P' containing parity blocks P0', P1', and P2' is generated on the basis of data blocks L3Data, L7Data, and L11Data that make up a stripe segment D1 on the disk drive 21, and data blocks L100Data, L1Data, and LA-TAG that make up a stripe segment D2 on the disk drive 22. The parity block P0' is generated by exclusive OR (XOR) of the data blocks L3Data and L100Data. The parity block P1' is generated by exclusive OR of the data blocks L7Data and L1Data. The parity block P2' is generated by exclusive OR of the data blocks L11Data and LA-TAG. Obviously, the parity blocks P0', P1', and P2' respectively correspond to the parity blocks P0, P1, and P2 in FIG. 2.

Subsequently, the controller 1 compares the parity data generated in step S604 with the parity data in the physical stripe loaded in step S603 for, e.g., each block to determine whether these parity data coincide with each other (step S605). In the above example, whether the parity data P' (parity blocks P0', P1', and P2') coincides with the parity data P (parity block P0, P1, and P2) is determined.

If these parity data do not coincide with each other, i.e., parity consistency check fails (NO in step S606), the controller 1 notifies the host 20 that a parity consistency error is detected (step S607). More specifically, the controller 1 notifies that an error occurs in parity consistency check process for the physical stripe loaded in step S603, i.e., for the physical stripe corresponding to the logical address of the valid logical block used by the host 20. When an error occurs, the controller 1 updates to the flag F2 a flag, in the entry in the stripe table 8, corresponding to the physical stripe loaded in step S603 (step S608). The flag F2 at this time represents that the parity consistency check has been processed and failed.

In contrast, if these parity data coincide with each other, i.e., parity consistency check is successful (YES in step S606), the controller 1 updates to the flag F1 a flag, in the entry in the stripe table 8, corresponding to the physical stripe loaded in step S603 (step S608). The flag F1 at this time represents that parity consistency check has been processed and successful.

The controller 1 then increments the entry number i by one (step S609) and determines whether the incremented entry number i exceeds the final entry number of the stripe table 8 (step S610). If the incremented entry number i does not exceed the final entry number of the stripe table 8 (NO in step S610), the controller 1 determines that the unprocessed physical stripe remains, and repeats the processes from step S603 in accordance with the incremented entry number i. If the incremented entry number i exceeds the final entry number of the stripe table 8 (YES in step S610), the controller 1 determines that all the entries in the stripe table 8 have been processed, and terminates the processing.

As described above, in the parity consistency check process in this embodiment, the valid logical addresses are searched for by using the address translation table 7, and the parity consistency checks are executed to only the physical stripes containing the physical blocks having the physical addresses corresponding to the searched valid logical addresses. This can shorten a time required for parity consistency check as compared with the method of checking parity consistency by loading all the physical stripes as in the prior art. More specifically, the processing time can be shortened by a time required for loading physical stripes each containing only the physical blocks having the physical addresses corresponding to the invalid logical addresses, and a time required for performing parity consistency checks for the physical stripes.

In this embodiment, the stripe table 8 which represents the physical stripes each containing the physical block of the physical address corresponding to the valid logical address is generated, and each entry of the stripe table 8 records a flag for parity consistency check. Therefore, for example, after the parity consistency check processing terminates, the controller 1 transfers the pieces of information of the stripe table 8 to the host 20, thereby notifying of parity consistency check states altogether. In this case, the process such as step S607 in which the parity consistency error is sequentially notified to the host is not always necessary.

A flag set in each entry of the stripe table 8 is used to determine whether a physical stripe having a physical number set in that entry has been processed. Therefore, for example, when the parity consistency check processing is interrupted and is then restarted, a flag in each entry of the stripe table 8 is looked up to determine whether a corresponding stripe has been processed, so that only the unprocessed physical stripes can undergo parity consistency checks.

[Parity Generation Process]

Figure 7:
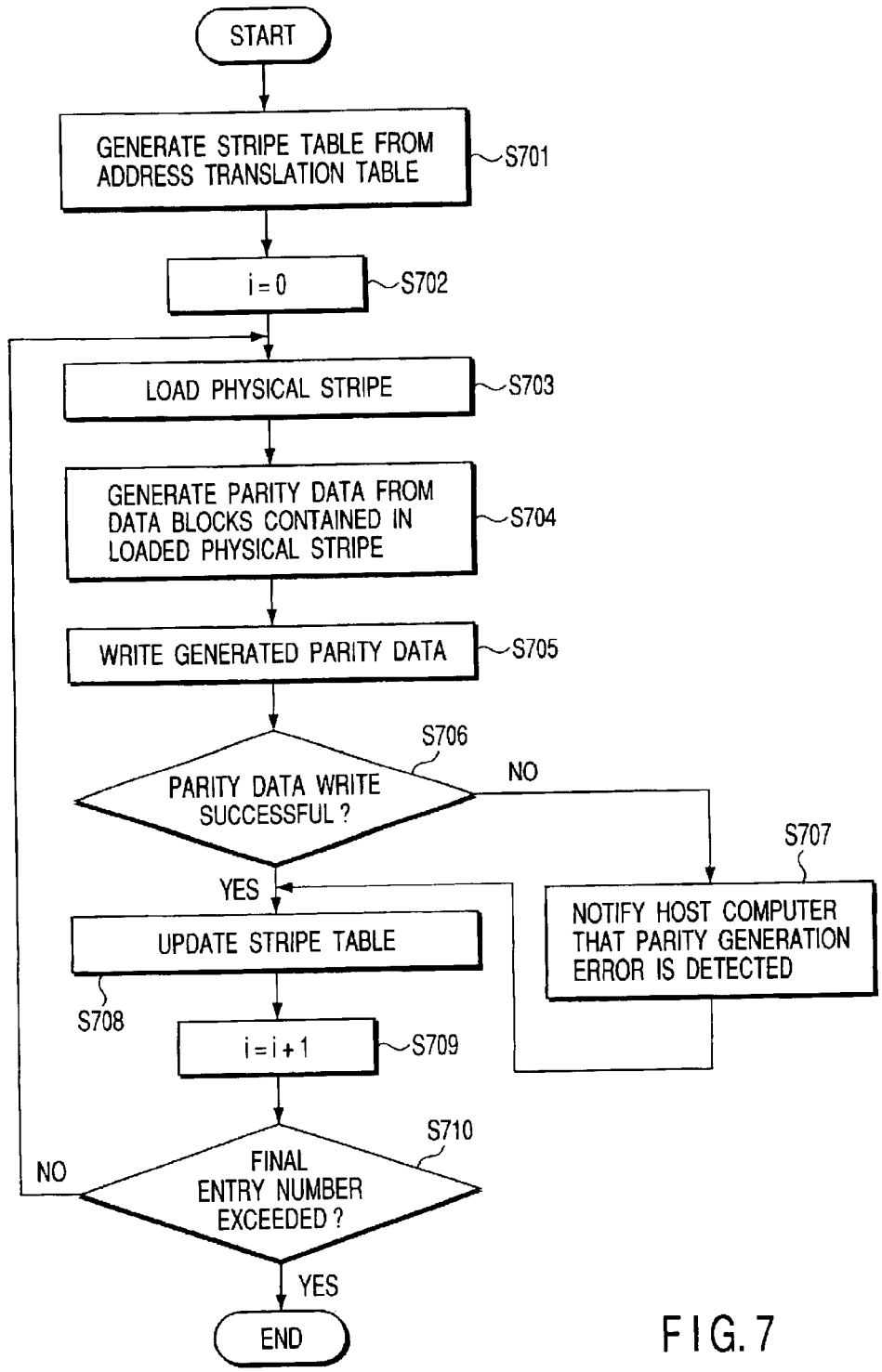
FIG. 7 is a flow chart showing parity generation process of the disk array apparatus.

FIG. 7 is a flow chart showing parity generation processing for the disk array apparatus 10. This parity generation process is performed in a case wherein it is confirmed that the parity consistencies of all the physical stripes serving as targets of the above-described parity consistency check processes are correct. Likewise the parity consistency check processing, the parity generation processing may be executed in response to a request from the host 20, or may be periodically executed by the patrol function of the disk array apparatus 10.

Similar to step S601 in FIG. 6, the controller 1 searches the address translation table 7 for physical stripe numbers corresponding to valid logical addresses. The controller 1 generates on the nonvolatile memory 3 the stripe table 8 having only the pieces of physical stripe information (in this case, physical stripe numbers) corresponding to the searched valid logical addresses (step S701).

After the stripe table 8 is generated, the controller 1 sets the initial value 0 in the entry number i representing the entry in the stripe table 8 (step S702).

Subsequently, the controller 1 acquires a physical stripe number set in the entry of the entry number i in the stripe table 8, and loads the physical stripe having this physical stripe number from the disk array 2 (step S703).

Similar to step S604 in FIG. 6, the controller 1 generates parity data from the data blocks in the loaded physical stripe (step S704).

The controller 1 then writes the parity data generated in step S704 in a predetermined disk drive of the disk drives 21 to 23 (step S705). More specifically, the parity data is written in the parity position on the disk drive in which the parity data contained in the physical stripe serving as a loading target in step S703 is stored, i.e., the parity position on the disk drive to which the parity data in the physical stripe belongs (the disk drive 23 in the example shown in FIG. 2).

The controller 1 determines whether the parity data is successfully written (step S706). This determination is performed by reading the parity data written in step S705 and checking whether the read parity data coincides with the previously written parity data. If parity data write itself does not normally performed, the controller 1 determines that parity data write fails.

If it is determined that parity data write fails (NO in step S706), the controller 1 notifies the host 20 that a parity generation error is detected (step S707). More specifically, the controller 1 notifies that an error occurs in parity generation process for the physical stripe loaded in step S703, i.e., the physical stripe corresponding to the logical address of the valid logical block used by the host 20. When an error occurs, the controller 1 updates to the flag F2 the flag, in the entry in the stripe table 8, which corresponds to the physical stripe loaded in step S703 (step S708). The flag F2 at this time represents that the parity generation has been processed and failed.

In contrast, if parity data write is successful, i.e., parity generation is successful (YES in step S706), the controller 1 updates to the flag F1 the flag, in the entry in the stripe table 8, which corresponds to the physical stripe loaded in step S703 (step S708). The flag F1 at this time represents that the parity generation has been processed and successful.

The controller 1 then increments the entry number i by one (step S709) and determines whether the updated entry number i exceeds the final entry number of the stripe table 8 (step S710). If the updated entry number i does not exceed the final entry number of the stripe table 8 (NO in step S710), the controller 1 determines that the unprocessed physical stripe remains, and repeats the processes from step S703 in accordance with the incremented entry number i. If the incremented entry number i exceeds the final entry number of the stripe table 8 (YES in step S710), the controller 1 determines that all the entries in the stripe table 8 have been processed, and terminates the processing.

As described above, in parity generation process in this embodiment, the valid logical addresses are searched for by using the address translation table 7, and parity generation is executed to only the physical stripes containing the physical blocks having the physical addresses corresponding to the searched valid logical addresses. This can shorten a time required for parity generation as compared with the method of generating parity by loading all the physical stripes as in the prior art. More specifically, the processing time can be shortened by a time required for loading physical stripes each containing only the physical blocks having the physical addresses corresponding to the invalid logical addresses, and a time required for performing parity data generation for the physical stripes.

In this embodiment, pieces of information of the stripe table 8 are transferred to the host 20 similar to the case of the above-described parity consistency check process, so that parity generation states can be notified altogether.

In this embodiment, when the parity consistency check process is to be interrupted and is then to be restarted, a flag in each entry of the stripe table 8 is looked up to determine whether a corresponding stripe has been processed, so that only the unprocessed physical stripes can undergo parity generation.

In addition, in this embodiment, when the parity processing (parity consistency check processing or parity generation processing) is to be performed, the stripe table 8 in the disk array apparatus 10 is used for searching for the valid physical addresses, so the host 20 need not manage the valid/invalid physical addresses. This allows to use the disk array apparatus 10 in this embodiment without changing an OS (Operating System), file system, device driver, and the like. In other words, the compatibility between the host 20 and disk array apparatus 10 can be ensured under different OS environments.

Note that both the items of the first flag representing the parity consistency check state and the second flag representing the parity generation state may be prepared in each entry in the stripe table 8 to perform the processes in the order of the parity consistency check process→the parity generation process. In this case, the stripe table 8 generated when the parity consistency check process starts is directly used for the parity generation process. In the parity generation process, by looking up the first flags, the controller 1 can execute the parity generation for only each valid physical stripe whose parity consistency has been confirmed.

Figure 8:
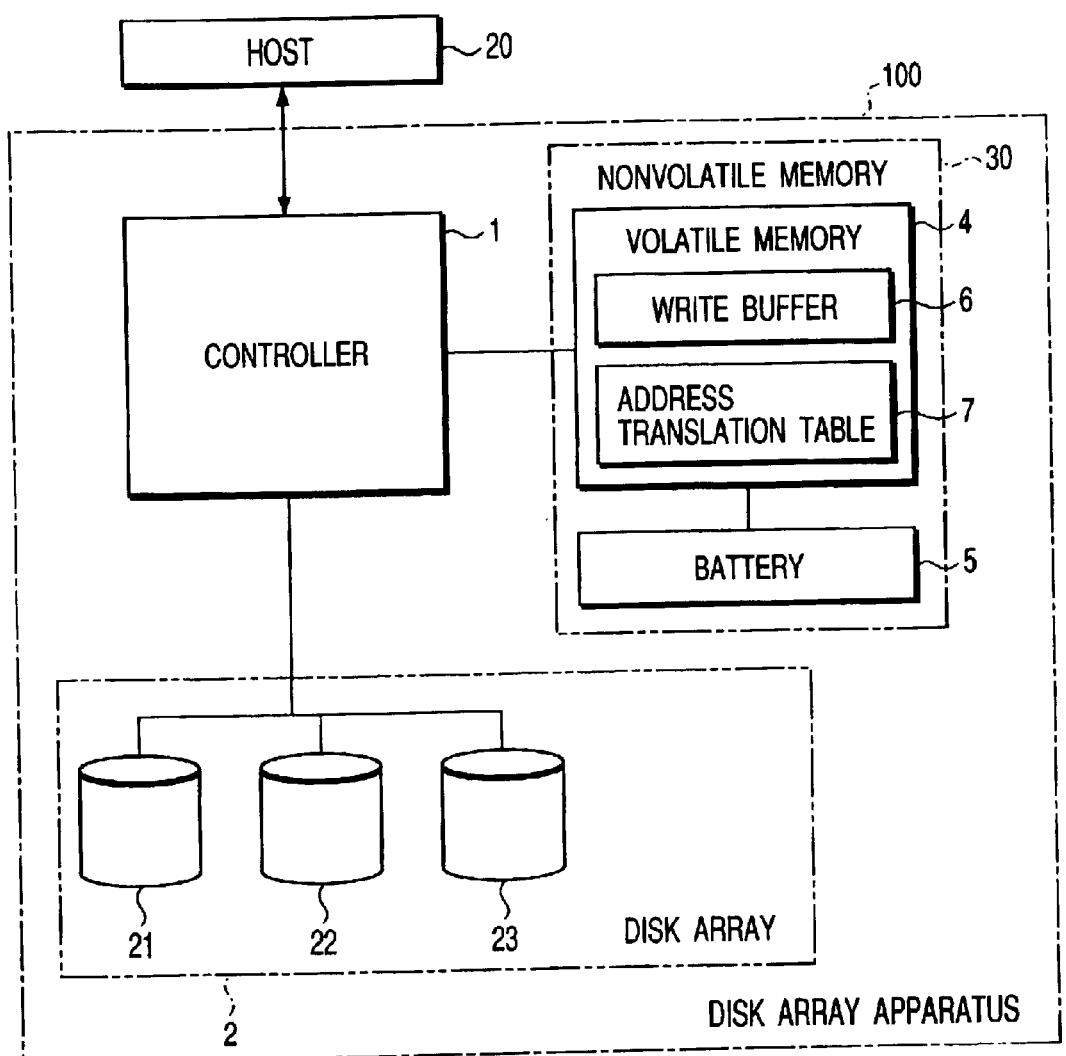
FIG. 8 is a block diagram showing the arrangement of a computer system having a disk array apparatus according to another embodiment of the present invention.

In the above embodiment, the write buffer 6 and address translation table 7 are allocated in the nonvolatile memory 3. However, the present invention is not limited to this. For example, a disk array apparatus 100 shown in FIG. 8 in which a write buffer 6 and address translation table 7 are allocated on a volatile memory 4 may be used. In this case, when the disk array apparatus 100 is to be turned off, the volatile memory 4 must be prevented from erasing its storage contents. For example, the volatile memory 4 is backed up by using a battery 5, thereby equivalently implementing a nonvolatile memory 30 which corresponds to the nonvolatile memory 3 shown in FIG. 1. That is, the write buffer 6 and address translation table 7 may be allocated in the nonvolatile memory 30 constituted by the volatile memory 4 and battery 5 (memory backup mechanism).

The above embodiment has been described on the assumption that the disk array 2 employs the redundant configuration of RAID4. However, the present invention can be similarly applied to a disk array in RAID level other than RAID4, e.g., a disk array with the redundant configuration of RAID5 or RAID50 in which a disk drive for storing the parity block is cyclically switched for each physical stripe. That is, the present invention can be similarly applied to a disk array with any type of redundant configuration as far as data in the faulty disk drive can be restored in the redundant configuration.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A disk array apparatus having a disk array with a redundant configuration which is constituted by a plurality of disk drives and detected by a host computer as one logical disk drive, comprising:

an address translation table in which address translation information used for translating a logical address of a valid logical block used by the host computer into a physical address on the disk array in which the valid logical block is stored is set;

search means for searching said address translation table for a valid logical address;

table generation means for generating a stripe table in which information representing a physical stripe containing a physical block with a physical address corresponding to the valid logical address searched by said search means is set;

loading means for acquiring the information of the physical stripe containing the physical block with the physical address corresponding to the valid logical address from the stripe table generated by said table generation means, and loading the physical stripe from the disk array on the basis of the acquired information; and parity processing means for performing a predetermined parity processing for the physical stripe loaded by said loading means, which sets flag information representing a result of the processing in correspondence with information representing the physical stripe in the stripe table.

2. A disk array apparatus having a disk array with a redundant configuration which is constituted by a plurality of disk drives and detected by a host computer as one logical disk drive, comprising:

an address translation table in which address translation information used for translating a logical address of a valid logical block used by the host computer into a physical address on the disk array in which the valid logical block is stored is set;

search means for searching said address translation table for a valid logical address;

table generation means for generating a stripe table in which information representing a physical stripe containing a physical block with a physical address corresponding to the valid logical address searched by said search means is set;

loading means for acquiring the information of the physical stripe containing the physical block with the physical address corresponding to the valid logical address from the stripe table generated by said table generation means, and loading the physical stripe from the disk array on the basis of the acquired information; and parity processing means for performing a predetermined parity processing for the physical stripe loaded by said loading means, which sets flag information representing that a process has been performed when the predetermined parity processing is performed on the physical stripe loaded by said loading means.

3. An apparatus according to claim 1 or 2, wherein said parity processing means comprises:

parity generation means for generating parity data from physical blocks contained in the physical stripe loaded by said loading means; and comparison means for comparing the parity data generated by the parity generation means with parity data contained in the physical stripe loaded by said loading means.

4. An apparatus according to claim 1 or 2, wherein said parity processing means comprises:

parity generation means for generating parity data from physical blocks contained in the physical stripe loaded by said loading means;

write means for writing the parity data generated by the parity generation means in a predetermined disk drive of the plurality of disk drives which constitutes the disk array; and check means for checking whether the write means correctly writes the parity data in the predetermined disk drive.

5. A disk array apparatus which has a disk array with a redundant configuration constituted by a plurality of disk drives, divides data, that is requested by a host computer to be written, into blocks to store the blocks in a buffer, and when data of a predetermined number of blocks are stored in the buffer, writes data of one stripe, which contains the data of a predetermined number of blocks and parity data for that data, in physically contiguous areas of empty areas of the disk array, comprising:

an address translation table in which address translation information used for translating a logical address of a valid logical block used by the host computer into a physical address on the disk array in which the valid logical block is stored is set;

search means for searching said address translation table for a valid logical address;

table generation means for generating a stripe table in which information representing a physical stripe containing a physical block with a physical address corresponding to the valid logical address searched by said search means is set;

loading means for acquiring the information of the physical stripe containing the physical block with the physical address corresponding to the valid logical address from the stripe table generated by said table generation means, and loading the physical stripe from the disk array on the basis of the acquired information; and parity processing means for performing a predetermined parity processing for the physical stripe loaded by said loading means, which sets flag information representing a result of the processing in correspondence with information representing the physical stripe in the stripe table.

6. A parity processing method in a disk array apparatus having a disk array with a redundant configuration which is constituted by a plurality of disk drives and detected by a host computer as one logical disk drive, comprising:

searching for a valid logical address an address translation table in which address translation information used for translating a logical address of a valid logical block used by the host computer into a physical address on the disk array in which the valid logical block is stored is set;

generating a stripe table in which information representing a physical stripe containing a physical block with a physical address corresponding to the searched valid logical address is set;

acquiring the information of the physical stripe containing the physical block with the physical address corresponding to the valid logical address from the stripe table, and loading the physical stripe from the disk array on the basis of the acquired information; and performing a predetermined parity processing for the loaded physical stripe, which sets flag information representing a result of the processing in correspondence with information representing the physical stripe in the stripe table.

7. A disk array apparatus which has a disk array with a redundant configuration constituted by a plurality of disk drives, divides data, that is requested by a host computer to be written, into blocks to store the blocks in a buffer, and when data of a predetermined number of blocks are stored in the buffer, writes data of one stripe, which contains the data of a predetermined number of blocks and parity data for that data, in physically contiguous areas of empty areas of the disk array, comprising:

an address translation table in which address translation information used for translating a logical address of a valid logical block used by the host computer into a physical address on the disk array in which the valid logical block is stored is set;

search means for searching said address translation table for a valid logical address;

table generation means for generating a stripe table in which information representing a physical stripe containing a physical block with a physical address corresponding to the valid logical address searched by said search means is set;

loading means for acquiring the information of the physical stripe containing the physical block with the physical address corresponding to the valid logical address from the stripe table generated by said table generation means, and loading the physical stripe from the disk array on the basis of the acquired information; and parity processing means for performing a predetermined parity processing for the physical stripe loaded by said loading means, which sets flag information representing that a process has been performed when the predetermined parity processing is performed on the physical stripe loaded by the loading means.

8. A parity processing method in a disk array apparatus having a disk array with a redundant configuration which is constituted by a plurality of disk drives and detected by a host computer as one logical disk drive, comprising:

searching for a valid logical address an address translation table in which address translation information used for translating a logical address of a valid logical block used by the host computer into a physical address on the disk array in which the valid logical block is stored is set;

generating a stripe table in which information representing a physical stripe containing a physical block with a physical address corresponding to the searched valid logical address is set;

acquiring the information of the physical stripe containing the physical block with the physical address corresponding to the valid logical address from the stripe table, and loading the physical stripe from the disk array on the basis of the acquired information; and performing a predetermined parity processing for the loaded physical stripe, which sets flag information representing that a process has been performed when the predetermined parity processing is performed on the loaded physical stripe.

* * * * *